(12) United States Patent
D'Agostini (10) Patent No.: US 7,580,828 B2
(45) Date of Patent: Aug. 25, 2009

(54) AUTOMATIC OR SEMIAUTOMATIC TRANSLATION SYSTEM AND METHOD WITH POST-EDITING FOR THE CORRECTION OF ERRORS

(76) Inventor: Giovanni D'Agostini, Via G. Giusti 17, I-33100 Udine (IT)

( * ) Notice: Subject to any disclaimer, the term of this patent is extended or adjusted under 35 U.S.C. 154(b) by 613 days.

(21) Appl. No.: 10/205,809

(22) Filed: Jul. 26, 2002

(65) Prior Publication Data

US 2003/0040900 A1   Feb. 27, 2003

Related U.S. Application Data

(63) Continuation of application No. PCT/IT01/00128, filed on Mar. 14, 2001.

(30) Foreign Application Priority Data

Dec. 28, 2000  (IT) .......................... UD2000A0228

(51) Int. Cl.
  *G06F 17/28* (2006.01)
(52) U.S. Cl. .............................. 704/2; 704/3
(58) Field of Classification Search .................. 704/2–8
See application file for complete search history.

(56) References Cited

U.S. PATENT DOCUMENTS

| | | | |
|---|---|---|---|
| 4,439,836 A | 3/1984 | Yoshida | |
| 4,599,612 A * | 7/1986 | Kaji et al. | 345/635 |
| 4,604,698 A | 8/1986 | Ikemoto et al. | |
| 4,633,435 A | 12/1986 | Morimoto et al. | |
| 4,831,529 A | 5/1989 | Miike et al. | |
| 5,020,021 A | 5/1991 | Kaji et al. | |
| 5,093,788 A | 3/1992 | Shiotani et al. | |
| 5,175,684 A | 12/1992 | Chong | |
| 5,257,187 A * | 10/1993 | Suzuki et al. | 704/3 |
| 5,303,151 A | 4/1994 | Neumann | |
| 5,338,976 A | 8/1994 | Anwyl et al. | |
| 5,349,368 A * | 9/1994 | Takeda et al. | 345/684 |
| 5,384,701 A | 1/1995 | Stentiford et al. | |
| 5,426,583 A | 6/1995 | Uribe-Echebarria Diaz De Mendibil | |
| 5,510,981 A | 4/1996 | Berger et al. | |
| 5,659,765 A | 8/1997 | Nii | |
| 6,047,252 A * | 4/2000 | Kumano et al. | 704/2 |
| 6,598,015 B1 * | 7/2003 | Peterson et al. | 704/3 |

FOREIGN PATENT DOCUMENTS

| | | |
|---|---|---|
| EP | 0 672 989 | 3/1995 |
| WO | WO 99/45476 | 9/1999 |

OTHER PUBLICATIONS

S. Amano; The Toshiba Machine Translations System; Jun. 1, 1986; 3 pages.
John R.R. Leavitt, et al.; Tooling the Lexicon Acquisition Process for Large-Scale KBMT; Nov. 6, 1994; 7 pages.

* cited by examiner

*Primary Examiner*—Patrick N. Edouard
*Assistant Examiner*—Lamont Spooner
(74) *Attorney, Agent, or Firm*—St. Onge Steward Johnston & Reens LLC

(57) ABSTRACT

A computer translation system is disclosed generally comprising a monitor displaying a pair of adjacent columns that have parallel scrolling means. The columns are divided horizontally to form at least two pairs of parallel scrolling fields, including a main pair of fields and a second pair located above the main pair. The main pair includes a translation field for text that is to be translated and a correction field for the translated text where an operator can check and correct this translated text. The second pair of scrolling fields includes first and second accumulating fields for progressively receiving and displaying the text from the translation field and the correction field, respectively.

5 Claims, 8 Drawing Sheets

AUTOMATIC OR SEMIAUTOMATIC TRANSLATION SYSTEM AND METHOD WITH POST-EDITING FOR THE CORRECTION OF ERRORS

CROSS REFERENCE TO RELATED APPLICATIONS

This application is a continuation of pending International Application No. PCT/IT01/00128 filed Mar. 14, 2001, which designates the United States and claims priority of Italian application No. UD2000A000228 filed Dec. 28, 2000.

FIELD OF THE INVENTION

This invention relates to an automatic or semiautomatic translation system and method with post-editing for the correction of errors.

In particular the invention relates to an improved computer translation system and method with intervention of the operator to obtain a high professional level translation quality depending on the capacity of the operator who checks the translation of the computer.

The technical field consequently is of high professional translation in the field of computer assisted translation, starting from a text of a certain language, memorized or able to be memorized in the computer, to produce texts in other languages in a manner checked by the operator.

The method is preferably used, even if not exclusively, in the field of translation, including automatic translation with post-editing operated by the operator, semiautomatic or interactive translation always checked by the operator during the evolution of the translation.

BACKGROUND OF THE INVENTION

The inventor realized, in 1987, an automatic translation system, today known on the market as "Hypertrans", which is able to operate on Macintosh by Apple Computer Inc. Cupertino Calif. U.S.

At that time translators in DOS systems were known but without analysis of the sentence, that is word by word, and therefore, without big substantial instructions but only using searching in a file and changing with the existing translation from the consultation dictionary, as there was the well known limit of 750 K.

Small sentence translators also existed at that time, but were based on a memory containing a limited number of more frequently used sentences.

At that time there also existed systems for translation with analysis of the sentence, however only on large computers or a mainframe, as for example "Systran" translator system.

Other systems were not known on the market and possible patented ideas had not found concrete application.

After experimentation and placing of the system on the market, this had continuous improvements particularly in the technological field, to be considered today worldwide, as the most qualitatively advanced technological professional translation system in all the combinations of the main European languages EN, DE, FR, IT, ES.

During the years an important improvement was made to the system for interactive translation giving the possibility of memorization of sentences for their eventual reuse as for example "Translation manager" of the IBM "International Business Machines", as one can also see from the following disclosure of the prior art.

Even if this methodology gave a great qualitative advantage of the translation, it had the inconvenience of the low probability level that the sentence memorized could be repeated frequently, so the system is used only for translations which are repetitive, as for example the translation of the instruction manuals of the machines, etc.

All the techniques known up to now freed the way to post-digiting or post-editing, which in any way had to be made manually by the operator after the translation in the same program (basic translation software) or in any word processing system. The subsequent completion times of a translation of a high professional level involved the sum of the translation time plus the final check and correction time, so, to date the sum of these two times is not competitive with the translation operated directly by a skilled-person who knows both languages very well.

The known system product by the same inventor and known on the market as "Hypertrans" operating on MAC computers of the Apple Computer of Cupertino Calif. U.S., is today a highly professional system of maximum quality, particularly directed to the technical field, such as patents.

It is able to translate with couples of bi-directional modules in any combination of English, German, French, Italian and Spanish, and also Portuguese.

This system of maximum professional level is able to supply to the operator, a very high quality grade, but the time required for the completion of the translation in perfect mode, that is machine time+man time (including the check and final correction), is always high, particularly for the final correction in post-editing.

This invention is particularly directed to the reduction of this post-editing time that is the human correction time.

In prior art there exist a plurality of machine translation systems.

Well-known are the following:

U.S. Pat. No. 5,510,981; Oct. 28, 1993; (IBM Corporation, Armonk, N.Y.);

Regarding a language translation apparatus and method using context-based translation models.

In particular:

An apparatus for translating a series of source words in a first language to a series of target words in a second language. For an input series of source words, at least two target hypotheses, each including a series of target words, are generated.

Each target word has a context comprising at least one other word in the target hypothesis.

For each target hypothesis, a language model match score including an estimate of the probability of occurrence of the series of words in the target hypothesis.

At least one alignment connecting each source word with at least one target word in the target hypothesis is identified. For each source word and each target hypothesis, a word match score including an estimate of the conditional probability of occurrence of the source word, given the target word in the target hypothesis which is connected to the source word and given the context in the target hypothesis of the target word which is connected to the source word. For each target hypothesis, a translation match score including a combination of the word match scores for the target hypothesis and the source words in the input series of source words.

A target hypothesis match score including a combination of the language model match score for the target hypothesis and the translation match score for the target hypothesis. The target hypothesis having the best target hypothesis match score is output.

U.S. Pat. No. 5,384,701; Jun. 7, 1991; in the name of British Telecommunications public limited company, London, England Regarding a Language translation system, and in particular:

A language translation system for translating phrases from a first language into a second language comprises a store holding a collection of phrases in the second language.

Phrases input in the first language are each characterized on the basis of one or more keywords, and the corresponding phrase in the second language is output. Such a phrasebook approach enables what is effectively rapid and accurate translation, even from speech.

Since the phrases in the second language are prepared in advance and held in store, there need be no problems of poor translation or ungrammatical construction.

The output may be in text, or, using speech synthesis, in voiced form. With appropriate choice of keywords it is possible to characterize a large number of relatively long and complex phrases with just a few keywords.

U.S. Pat. No. 5,338,976; Jun. 16, 1992 in the name of Ricoh Company, Ltd., Tokyo, Japan Regarding an Interactive language conversion system; and in particular:

A language conversion system includes a database of expression patterns in the object language, a relevance evaluation mechanism for evaluating a relevance of each expression patterns in the object language with respect to an input in the original language, a retrieval and identification mechanism for retrieving and identifying from the input in the original language information requested by the expression pattern in the object language required to generate an output in the object language, a selection mechanism for selecting the expression pattern in the object language conforming to the input in the original language depending on the relevance evaluated in the relevance evaluation mechanism, an output mechanism for generating the output in the object language based on the required information retrieved and identified from the input in the original language by the retrieval and identification mechanism, and a control mechanism for controlling operation sequences of the relevance evaluation mechanism, the retrieval and identification mechanism, the selection mechanism and the output mechanism.

U.S. Pat. No. 5,659,765 filed on Mar. 14, 1995, Machine translation system in the name of Toppan Printing Co., Ltd., Tokyo, Japan Claiming:

A machine translation system comprising:

first input means for inputting a first character string written in a first language;

second input means for inputting a second character string written in a second language;

display means for simultaneously displaying the first and second character strings input from said first and second input means; linking means which has first designating means for designating a third character string included in the first character string displayed by said display means, and second designating means for designating a fourth character string included in the second character string displayed by said display means, and links the third and fourth character strings with each other;

recording means for recording the third and fourth character strings linked by said linking means as a pair; and means for detecting the character string which is most similar to an original character string written in the first language from a plurality of recorded third character strings, and translating the original character string into a character string written in the second language by using a fourth character string linked with the detected character string.

U.S. Pat. No. 5,426,583; Jan. 27, 1994 in the name of Uribe-Echebarria Diaz De Mendibil; Gregorio, Erandio, Bilbao, Spain Regarding Automatic interlingual translation system.

Claiming

A method for use in a computer to automatically translate a first text based on a source language to a second text based on a different target language, said method comprising the steps of:

(a) analyzing said first text to achieve an arborescent-type clarification on morphological, syntactical and semantic characteristics of said first text;

(b) translating the analyzed text to a first intermediate language, wherein said first intermediate language contains structural characteristics of said source language;

(c) integrating the translated text into an interlingual, wherein said interlingual contains morphological, syntactical, and semantic features of a plurality of languages;

(d) translating the integrated text to a second intermediate language, wherein said second intermediate language contains structural characteristics of said target language; and (e) converting the translated, integrated text to said second text.

U.S. Pat. No. 4,604,698; Dec. 22, 1983 in the name of Sharp Kabushiki Kaisha, Osaka, Japan Regarding an Electronic translator including character input keys for inputting a first language word, a translator for translating the inputted first language word into the second language word, a retranslator for retranslating the second language word back to the first language word, and a display unit for displaying the inputted word, translated word and retranslated word.

U.S. Pat. No. 4,439,836; Oct. 22, 1980 in the name of Sharp Kabushiki Kaisha, Osaka, Japan Regarding an Electronic translator, claiming:

An electronic translator device for obtaining a second word represented in a second language equivalent to an input word in a first language, comprising:

input means for entering the input word;

first memory means for memorizing a plurality of first words in the first language, each of said first words comprising one or more first letters which remain unchanged regardless of inflection and one or more second letters which change according to inflection;

address means operatively connected to said input means and responsive to entry of the input word for addressing said first memory means to develop one of the plurality of first words;

detection means operatively connected to said first memory means and responsive to said address means for detecting equivalency between the input word and said first letters of respective first words;

second memory means for memorizing a plurality of second words in the second language corresponding to first words stored in said first memory means;

first means operatively connected to said detecting means for activating said second memory means whereby said second memory means develops a second word corresponding to the input word when the input word is equivalent to one of said first words; and second means operatively connected to said detecting means for indicating that one of said first words in said first memory means comprises a noninflected form of the input word.

U.S. Pat. No. 4,633,435; Jul. 22, 1985 in the name of Sharp Kabushiki Kaisha, Osaka, Japan Regarding an Electronic language translator capable of modifying definite articles, and in particular regarding an electronic translator is featured in which sentences as stored are modified by replacing one or more words in one of the original sentences with one or more new words and by changing automatically one or more additional words in the original sentence, depending on the nature of the one or more new words entered in the sentence. For example, the one or more additional words may be definite articles or prepositions.

U.S. Pat. No. 4,831,529; Feb. 12, 1987 in the name of Kabushiki Kaisha Toshiba, Kawasaki, Japan Regarding a Machine translation system Claiming:

A machine translation system for translating a first language into a second language, which comprises:

input means for entry of an original written sentence in the first language into the system;

dictionary means having at least a first dictionary for storing various words in various parts of speech and their translation in the second language respectively corresponding to the words in the first language, and a second dictionary for storing various words designated as nouns corresponding to words in the first language;

translation means for analyzing the original written sentence in the first language, for retrieving said dictionary means and for executing the translation processing of the input original, when any same word designated as nouns stored in the first dictionary is found in the second dictionary, the word stored in the second dictionary takes precedence over that in the first dictionary in the translation means; and output means for producing translated sentences in the second language obtained from said translation means.

U.S. Pat. No. 5,020,021; Jan. 10, 1986 in the name of Hitachi, Ltd., Tokyo, Japan Regarding a System for automatic language translation using several dictionary storage areas and a noun table, and in particular regarding a translation method for a machine translation system provided with apparatus for parsing a source language sentence and for forming a target language translation in which a phrase omitted in the source language sentence is identified, and a word or phrase to be inserted for the omitted phrase is selected from stored words and phrases. For identifying an omitted phrase, a sentence pattern corresponding to a predicate in the source language sentence is formed so as to include not only cases governed by the predicate but also a semantic feature for each case. By comparing the source language sentence with the sentence pattern, a case which is omitted in the source language sentence but cannot be omitted in the target language translation is identified. For determining a word or phrase to be placed at the position of the omitted phrase, the nouns having appeared in the source language text is stored in a noun, together with the semantic feature, gender, person and number of each noun is searched for a noun having the same semantic feature as the omitted phrase. When a target language translation of the source language sentence is formed, a pronoun having the same gender, person and number as the omitted phrase is used as a target language equivalent for the omitted phrase, and thus a target language translation which is grammatically correct, is obtained.

U.S. Pat. No. 5,093,788; Jun. 25, 1987 in the name of Sharp Kabushiki Kaisha, Osaka, Japan Regarding a Translation machine system with splitting and combining of sentences.

And claiming:

An electronic translation machine system for translating multiple sentences from a source language to a target language comprising:

input means for inputting a plurality of source sentences;

first buffer means in communication with said input means for storing said source sentences;

position designation means coupled with said first buffer means for designating a division point separating a selected source sentence into parts and for inserting a position designation symbol in said selected source sentence;

splitting means in communication with said first buffer means for scanning said selected source sentence for said position designation symbol and, once encountered, for splitting said selected source sentence into parts and for storing said parts in said first buffer means; and translation means for translating the parts of said selected source sentence stored in said buffer means from said source language to said target language.

U.S. Pat. No. 5,175,684; Dec. 31, 1990 in the name of Trans-Link International Corp., Honolulu, Hi.

Regarding an Automatic text translation and routing system,

Claiming:

A machine translation system comprising:

a machine translation module which is capable of performing machine translation from input text of a source language to output text of a target language, said machine translation module having a plurality of target language submodules for performing machine translation into a plurality of different target languages;

a receiving interface for receiving via a first telecommunications link an electronic input which is divided into pages, said input pages including a cover page having predefined fields containing system information therein and at least one text page in a source language, wherein said cover page includes at least a first predefined field designating an address of an addressee to which translated output text is to be sent, and a second predefined field designating a selected one of the plurality of different target languages into which the at least one text page is to be translated, and wherein said receiving interface includes a recognition module capable of electronically recognizing the address of the addressee designated in said first predefined field of the cover page of the received input pages, and the selected target language designated in said second predefined field of the cover page;

a sending interface for sending output text generated by said machine translation module to an addressee via a second telecommunications link; and control means coupled to said receiving interface, said machine translation module, and said sending interface for recognizing the address and target language designated in said predefined fields of said cover page, for controlling said machine translation module to generate output text of the designated target language from the input text of the source language, and for operating said sending interface to automatically send the translated output text via the second telecommunications link to the designated address recognized from said predefined fields of said cover page.

U.S. Pat. No. 5,303,151; Feb. 26, 1993 in the name of Microsoft Corporation, Redmond, Wash.

Regarding a Method and system for translating documents using translation.

Claiming:

A computer system for translating a source language document written in a source language to a target language document written in a target language, the source language including a multiplicity of source terms and the target language including a multiplicity of target terms, the computer system including a display screen, the source language document, a product glossary having a plurality of source terms from the source language and a plurality of target terms from the target language, each source term being associated with the corresponding target term which translates the source term into the target language, the computer system comprising:

means for producing a translation screen portion on the display screen, the translation screen portion including a current insertion point;

means for displaying the source language document on the translation screen portion;

means for comparing each of the plurality of source terms from the product glossary with the source terms in the source language document;

inserting means for inserting a character adjacent to the source term in the source language document, in response to each comparison by the comparing means which produces a match between one of the source terms in the source language document and one of the source terms in the product glossary;

means for associating in an index file the inserted character with a target term from the product glossary that translates the matched source term from the source language into the target language;

means for inputting an insert target term command which contains a translation request character corresponding to the inserted character;

means for retrieving the translation request character from the insert target term command;

means for retrieving from the index file the target term associated with the retrieved translation request character; and means for inserting the retrieved target term on the translation screen portion in response to the insert target term command.

The drawbacks of the state of the art consist substantially in the fact that the current systems or translation methods do not allow the operator to reach a suitable working performance with high quality level translation without a very long time detriment for the necessary correction work of the skilled man, and in particular, we have observed that as the automatic translation, or semiautomatic translation, namely for fragments or sentences, it is never perfect, and has a lot of errors, and one loses a lot of time to correct the text in post-editing to adapt it to an acceptable quality level.

Further, even if one provides a translation for fragments or sentences or paragraphs in continuous succession (machine-aided translation or interactive translation), one still loses a lot of time for corrections, and also, repeated corrections must be made for the repetition of the same type of translation mistake, as a computer will endlessly repeat the same mistake, unless the programmer who has supplied the operating instructions to the program intervenes.

The operator unfortunately cannot intervene in the programming system of which is equipped with the respective translation engine.

But even if the programmer could intervene, the time required for reprogramming or teaching of the new case, the check of the functionality and the advantage that one wants to obtain therefrom become inadmissible.

In fact, the mistake generated by the computer in the translation is likely to derive as an incorrect or ambiguous exposition, as it is well known that when the human being writes he does not think about the rules, but writes on impulse without considering the ambiguities and the plurality of meanings for the same word or expression, and such cases of not respecting the rules are innumerable and always increasing.

Consequently wanting to foresee and encode everything is impossible for the large number of possible combinations.

When a text already edited is checked, the correction time is therefore always high even if there are automatic search replace engines.

In fact, the current automatic search and replace engines require the operator to manually input the correction each time, manually selecting the specific text to be corrected.

The quality of the search and replace often generates other errors due to the necessary adapting of what has been changed in the specific context in said position, being many times obliged to adapt the changing portion in accordance to the preceding text portion and to the following text portion.

Todays, the systems for translation are very fast and require a time lower than reading the text to translate (e.g. ten pages few minutes): The quality of the resulting translation by automatic translation is not acceptable for the skilled man, and it needs a lot of time for correction (e.g. for 10 pages 4-5 hours), and this is because the skilled-translator man, always needs time to read, interpret, and then check if the automatic translation system has made good or bad corrections, and then make corrections to what has been translated automatically.

Therefore a lot of expert translators prefer to renounce automatic translation because they use more time to correct than to do a direct translation without the use of the automatic or semiautomatic translation.

The problem of the reduction of the translation time at a parity with the best resulting quality from the human translation is always in need, particularly for the current globalization of the markets and unification of the people who speak different languages.

Consider for example the global communications, laws, patents, etc, where the quality of the translation should be at a maximum level.

SUMMARY OF THE INVENTION

It is an object of the present invention to avoid the above-mentioned drawbacks and allow the obtainment of a perfect translation or in any way a high quality translation, namely at human level, or better, with the use of the automatic translation system or semiautomatic translation and comparatively in less time.

Therefore the main purpose of the present invention is to use the automatic or interactive-semiautomatic computer translation but with strong reduction of the translation time and with the maximum obtainable quality with the intervention of the same skilled-operator.

In order to achieve these objectives, the invention includes a computer translation system having viewing means on monitor of a translation-interface having a couple of text-columns, wherein each text-column includes parallel scrolling field means, characterized in that the couple of text-columns are divided horizontally to form at least two pairs of parallel scrolling fields the at least two pairs comprising a main pair of scrolling fields including a main translation field having text to be translated and a correction field, having a translation of the text, for checking and correcting the translated text, and a second pair of scrolling fields, located above the main pair, including first and second accumulating fields for accumulating checked text from the main translation field and the correction field, respectively, the computer translation system having transfer means to progressively transfer a portion of the texts in the main translation and correction fields to the accumulating fields.

In this way checking and correction is more easy and fast, because of continuous alignment of top paragraphs of the main translation and correction pair of fields, making easy check between correspondent words and sentences of two parallel top-paragraphs of the entire text, strongly reducing time. Furthermore transfer of checked top-paragraphs to the bottom of the accumulating fields, in adding to the accumulating fields, allow more easy checking and correction of remaining text in said main fields, this working being repeated until the entire text has been line-by-line checked, corrected and transferred to said accumulating fields (in technical speaking "line by line",=paragraph by paragraph, because in electronic word processing, a "RETURN" delimits a Complete Paragraph="LINE").

Advantageously said translation system is endowed with moving means to move said pair of accumulator fields from immediately above said pair of main translation and correction fields to another place or make them disappear, said transfer means being anyway able to work to transfer paragraphs from main pair to the accumulator pair.

In this way it is possible to check, paragraph by paragraph, the whole translation, transferring the checked text, paragraph by paragraph ("line-by-line" in computer programming) to said accumulating fields, reducing the checking-time to over 50% and obtaining better performance.

A progress of translation is advantageously shown using a paragraph-counter means, indicating the number of checked paragraphs and the number of remaining paragraphs to check and evidencing means of modified text in said pair of main translation and correction fields. In this way further reduction in the checking time is allowed because operators see immediately what remains to be checked.

Advantageously the computer translation system is of the type having viewing means on the monitor of the translation-interface comprising a T-shaped structure having an upper bar and a vertical shank, where the upper bar of the T-shaped structure comprises a line of control buttons and the vertical shank is a dividing line forming the couple of text-columns, wherein each column includes scrolling field means having a width proportional to the length of the text therein substantially equal to each other column, characterized in that said couple of text-columns is divisible horizontally forming a T-shaped structure with a lower bar through the shank forming the at least two pairs of parallel scrolling fields.

The solution process provides an automatic/semiautomatic translation method, for processing the translation in the desired language, of the type utilizing a translation system which comprises means of automatic or semiautomatic translation and means to allow the correction of the translation operated by the computer and means to implement the dictionaries in the computer, and word processing means in post-editing for the checking and the final correction with eventual activation of automatic search and replace, characterized by:

integrating the post-editing in a single ensemble with the translation system, and identifying and memorize each correction that is carried out in post-editing, and in a single operation, activating the search and replace of the mistake in the text in correction, and activating the memorization of the correction carried out to said translation system with integration of one or more program semantic codes, in order to obtain at the same moment and directly connected to the respective correction, not only the extension of same correction to the text in post-editing, but also the auto learning of the correction itself to said translation system.

In this way one has the advantage of a continuous improvement of the quality of the translation and of a continuous reduction of the errors and consequent reduction of the total time for obtaining the text not only translated but also checked and perfectly finished.

Advantageously the method provides on the inside a translation system that includes:

at least one electronic dictionary with correct translation of sentence fragments, sentences and words, associated, for each translation, with a programming semantic code, that activates during the translation of a text or text portion, a respective adapting program of the translation in progress to the preceding text portion and/or to the following text portion for adapting to a specific context;

means for making the translation phrase by phrase of the text with sequential analysis of the subsequent words and/or sentence fragments within the extent of treatment of the respective sentence, associated to comparing means of the words or sentence fragments, to identify materially or virtually also with declination or base or root, their presence in said electronic dictionary, to make possible a sequential translation;

processing means of the translation on the basis of the said dictionary and of the corresponding program semantic codes:

with eventual adapting of the current translation to the preceding text portion and to the text portion that follows that in processing and, with eventual adapting in accordance with the current translation of the part already translated;

output means to memorize and show the operated translation;

characterized by providing:

a plurality of said program semantic codes, each associated to a respective translation software with different modality, said modality being known to the operator that operates the translation in order to allow the use of one or the other code or the combination of more codes to define a certain translation software for a specific text portion;

memory means of the carried out corrections and, on request of the operator;

activation means of an auto learning program which was previously corrected, determining the new teaching to operate, enclosing:

the text portion that contains said correction, and the corresponding original text portion that had to be translated, and inputting one or more program semantic codes at this new teaching to be added in said electronic dictionary, in order that said teaching deriving from previous correction can be reutilized immediately in the following translation.

In this way the system retrieves automatically not only the correction operated by the human operator as traditionally used, but upon approval of the operator, also utilizes this correction remembering it as a new teaching and avoiding the subsequent repetition of the translation mistakes made by the computer.

In this way the translation system becomes substantially intelligent as it is endowed with auto learning and the translation in this way will continuously improve, and more corrections and teachings will be done and improve the result, reducing progressively the errors made and allowing a sensible reduction of time for the completion of the translation at a level of human quality;

Advantageously the system further provides on the inside:
activation means, on command, after the correction, of the following steps:
identify the last change made on the text comparing the original previous text and the modified text;
propose in a dialog box the previous text and the modified text or the text to modify, if signaled;
on acceptance, make an automatic search and replace in the entire text already translated.

In this way the correction times reduce furthermore, with important productivity advantages.

We carried out translation tests with post-editing after automatic translation with the new process on a Mac G3 Computer at 400 MHz for the same sample patent-disclosure of 10 pages:

with the interactive traditional system: the translation time + the hand-operated post-editing time was of two hours;
with the new system the time used resulted in half an hour;
the increase in productivity therefore was about 400%, as it is not only the number of the corrections that reduces, but also and above all the stop and consulting times for each correction.

Advantageously the method provides on the inside the option of the fully automatic or semiautomatic translation. In this way it is possible to operate in accordance to the specific requirements, with the difference that with the automatic translation the signaled errors will be eliminated only in the next text to translate, while with the interactive or semiautomatic translation the errors are eliminated during the translation itself as they appear.

The method includes the visualization on the screen of a first scrolling field to receive the text to translate and a second scrolling field to show the translation, one adjacent and parallel to the other, which proportion automatically in the respective width in a manner inversely proportional to the length of the two texts. In this way one has the immediate advantage to supply a fast and immediate confront line by line, of the original text in respect of translated text substantially at the same height, being further provided in parallel sliding means of both the fields.

With such solution one has the advantage of a faster comparison improving considerably the correction times. In fact the difficulty in the translators that must check the original text with the translation to follow step by step the original text and the translated text is known, and sometimes one loses precious minutes just to find the original word corresponding to the one translated.

In order to further speed-up and identify the missing words not translated the system provides automatically the conversion of their writing in bold or italic or different color, facilitating and speeding up furthermore the system for the search and the identification of the parallel correspondence between the two words/expressions in the parallel fields.

More advantageously the method provides automatic uploading and downloading means for the text to be translated and for the translated text respectively, fragmenting it, in at least 5 pairs of memory fields, each field providing substantially the contents of 30000 characters (about. 20 pages). In this way one has the advantage of supplying the possibility to the operator to treat also large texts (e.g. up to 100 pages at a time), with the same quality and without danger to make errors in the reconstruction of the translated text.

More advantageously one provides over the pair of translation main fields, at least a pair of accumulator fields, namely with accumulating function similarly placed in parallel and of same width of the pair of main fields to be used:

In order to further speed-up and individuate the missing words not translated the system provides automatically the conversion of their writing in bold or italic or different color, facilitating and speeding up furthermore the system for the search and the individualization of the parallel correspondence between the two words/expressions in the parallel fields.

More advantageously the method provides automatic unloading and charging means for the text to translate and for the translated text respectively, fragmenting it, in at least 5 couples of memory fields, each field providing substantially the contents of 30000 characters (about. 20 pages). In this way one has the advantage to supply the possibility to the operator to treat also large texts (e.g. up to 100 pages at a time), with the same quality and without danger to make errors in the reconstruction of the translated text.

More advantageously one provides over the couple of the said translation main fields, at least a couple of accumulator fields, namely with accumulating function similarly placed in parallel and of same width of the said couple of main fields to be used:
both for interactive translations with correction during translation,
and for correction in post-editing after the automatic translation.

In this way the accumulator system loses nothing because of break-off of the course of the translation always allowing to take up at any time without losing anything. Furthermore one always has the advantage of a perfect line-out of the remaining paragraphs still to correct, that progressively pass to the couple of the said accumulator fields.

More advantageously under the said translation main fields, a couple of text fields remaining to translate is provided.

In this way the program operates interactively transferring progressively a paragraph at a time, from the couple of interesting lower fields, in one or into the other, the text to translate, to said couple of the main fields to make the translation and the following correction, being before the translated and corrected text in said fields, moved to the said couple of said accumulator fields.

In this way one has the additional advantage of a complete visualization both the translated text, and the text in progress of translation, paragraph by paragraph, therefore with best visualization for checking in parallel.

In this way one has the additional advantage of a complete visualization both of the translated text, and the text in progress of translation, paragraph by paragraph, therefore with good visualization for checking in parallel.

Advantageously in a window the number of the checked and translated paragraphs and the number of the paragraphs remaining to translate are indicated. In this way one has the advantage of always having under control the amount of time needed to complete the work.

More advantageously the method provides for each correction carried out in the translated text, besides the integrated search replace and of autolearning options, the autoactivation of the differentiation of the characters of the corrected word/fragment and corresponding portion of the text to translate putting them in distinguishable characters by the rest of the text, as for example bold, italics or other color.

In this way it is immediately signaled to the operator up to where the corrections have been made, facilitating and reducing therefore the time required to complete the work. In fact skilled persons know the time that one wastes if one forgets where he was and this particularly in the treatment of long texts, as for example the patents.

Advantageously the method provides the addition for each teaching different possibilities of translation of the same text with separate corresponding program semantic codes.

In this way, in function of the programmed option the system can choose the one or the other translation according to the context.

More advantageously the method includes the possibility to impute different teaching depending on context, e.g. electric, electronic, chemical, mechanic, aeronautic, . . . , medical, sporting, clothing, legal, spoken or speech, etc., each able to be activated by a code previously assigned to or from the translation itself in relation to the type of translation. In this way for different subjects a translation correspondingly different is supplied (personalization). It is known in fact that for example the patents are classified according to an international coding for different technological sectors (IPC code). Each category of patents has a code, so imputing before the translation said code, if it regards a document that relates to electronics the system will translate in one manner or the other (e.g. chips=patatine for the alimentary (food) domain and chips=chips for the electronics etc.)

More advantageously the method and respective system provide in the machine-aided translation the translation by the said charger, paragraph by paragraph, namely one paragraph at a time, allowing in turn the correction with autolearning (self-learning).

In this way one has the great advantage of considerably better performing the quality of the translation and to speed-up furthermore the correction and translation time as, thanks to the first error corrections at the beginning of the translated text, the system learns automatically, and at once, memorizes this kind of text and utilizes these teachings immediately in the prosecution of the translation in the same text.

Without autolearning the quality of the automatic translation always remains the same, so if an automatically translated patent has 60 corrections to be made in the first page and its length is of 10 pages, the total corrections to be made are approximately 60 errors/page×10 pages=600 mistakes to correct, while with the autolearning already in the first page the errors are reduced by half as the translation is carried out paragraph by paragraph, and in the following pages the errors continuously reduce the half of the half as the previous half has already been eliminated and cannot repeat, and so forth so far as to reach a minimum that generally is not lower than 10%, so with the invention one has a total of errors to correct equal to (30 first page+15 second page+8 third page+6×7 remaining pages=95 corrections.

Therefore a saving of 600−95=505 errors on 600, equal to theoretically over 80% less of corrections, to say one increases the productivity of 500% namely five times.

As a matter of fact one must consider a greater time lost for the teaching that one can estimate not lower than 20% of the correction-time, maximum 30%, so one returns to what was experimented, namely to an increasing of productivity, if the time lost for the teaching is of 30%, of (600/95)×0.7=442%. As a matter of fact the advantage will be as much and as high as the number of the corrections to be made and so much higher is the number of the pages to translate.

It is obvious instead that such advantage reduces considerably for automatic translations in which the number of corrections is much more limited, or if the translation is very short, e.g. some paragraphs.

In such case the advantage that we can obtain is only to increase the performance in productive quality of the automatic translation of the system.

To reduce the times and have optimal quality, there is provided means which make possible, after the automatic translation of the entire text and subsequently, the sequential post-editing with correction and checking from a skilled man, by means of correction with autolearning and autoreplacing paragraph by paragraph, canceling progressively the couple of the checked paragraphs and transferring them in said pair of accumulating fields.

In this way one has the advantage of having as the previous one, the immediate parallel visualization of the paragraph to translate and what is translated for the contribution of the corrections but with the additional advantage to be able to also see the whole text that follows both for the field to translate and for the translated. With this solution particularly the check and comprehension times from the operator of what has been translated and corrected are reduced, having a more wide view of the entire text, of what is in translation and of what is following during translation.

In connection with the above one provides the comparison of the following automatically translated paragraph with the corresponding paragraph on the screen, in order that if they do not correspond, for eventual operation of automatic search-replacing, one can remake automatically the retranslation with the new teachings, reducing in such case furthermore the number of corrections that one must do.

This solution, if it requires more time for the retranslation, of the paragraph concerned, provides a possibility to the operator to evaluate the correct learning and eventually readapt it with a new teaching that, according to the system, can be changed or customized for the specific case.

More advantageously in the system a third comparison field associated with the first two is provided, in order to introduce the correct text of the translation from another outside operator and this in order to operate interactively by comparison and when non correspondence is detected, activate the respective proposals of autolearning of the teachings deriving from the outside corrections.

In this way one has the advantage to be able to use teachings also coming from the exterior of the system, for example by control carried out not in the same batch, but for example for the post-editing on other machines for example connected via internet.

In conclusion with this method, not only the quality of the translation is sped-up and improved, but one provides the possibility to the operator to personalize and implement progressively during the translation itself or even later, not only the missing words or the usual and repetitive sentences as in the known systems of the prior art, but also sentence fragments, which thanks to the respective programming semantic code supplied by the operator himself, but also suggested by the program during the context analysis of the translation, of the prefixes, of the endings, etc:, can insert and automodify itself in adequate manner in the following translations and in the same following of the translation in progress.

Thanks to the well known repetition of countenances in the documents in translation, the system adapts automatically and rapidly to the new translation sector giving, after the first steps of translated text, a progressively best resulting translation level and absolutely incomparable quality level with reference to any currently known translation system.

The tests carried out have supplied amazing results that even after a small amount of translation the errors made for sentence drop to a minimum, reaching almost immediately the errors average value for sentence between 1 and 2, to then reach the errors value for sentence>1.

Preferred variations advantageously in the system included:

*) a checking window of the autolearning with three lines for checking, correction and input:
a fragment of phrase of the text to be translated;
a fragment of phrase translated in a correct way, which is either the object of the correction in progress or already carried out;
a programming semantic code.

**) the in-line consulting of dictionary with alternative translations.

***). during the correction in post-editing:
determining the position of the cursor in the correction area or otherwise if a portion is memorized by highlighting, calculating automatically the number of the paragraphs and corresponding sentences and words number of the translation, from the origin and,
on the basis of the correspondence of the punctuation positions, supply in a window on the screen:
the sentence portion previously highlighted in the interested correction area identified by the presence of the cursor from the last correction or previously highlighted, and
the sentence corresponding portion of the document to translate,
in order to allow to the operator to: highlight the fragment of phrase corresponding to the portion that contains the correction.

This automating and speeding up the search and the input of the autolearning

****). Over the pair of fields a control-bar for control operations forming substantially a "T" base interface in which the upper cap of the "T" is the control-bar by means of the association of push-buttons and fields and the shank of the "T" divides substantially the right-hand field/s from the left-hand field/s of the pair of main fields regarding the document to translate in progress and its translation, is further provided.

In this way all is reunited and integrated in a maximum control and working performance.

Described herein is at least one form of realization of the invention

These and other advantages will appear from the following description of concrete solutions:

BRIEF DESCRIPTION OF THE DRAWINGS

FIGS. from 1 to 18 represent the visualization of the window interface of the translation system with two columns, therefore realized according to the method as in the present invention in different processing steps respectively from (A) to (R), with the visualization of the only two proportionally parallel correction and translation main fields.

FIG. 21 represents a view of the screen with translation and correction fields, a corresponding pair of accumulator fields, and a third pair of fields for the remaining text to be translated.

FIG. 22 represents a view of the screen with a third column for comparison of the text translated and corrected outside the system.

FIG. 23 represents a view of the screen with translation and correction fields and a corresponding pair of accumulator fields during a correction post-editing.

DETAILED DESCRIPTION OF THE INVENTION

Figure 1:
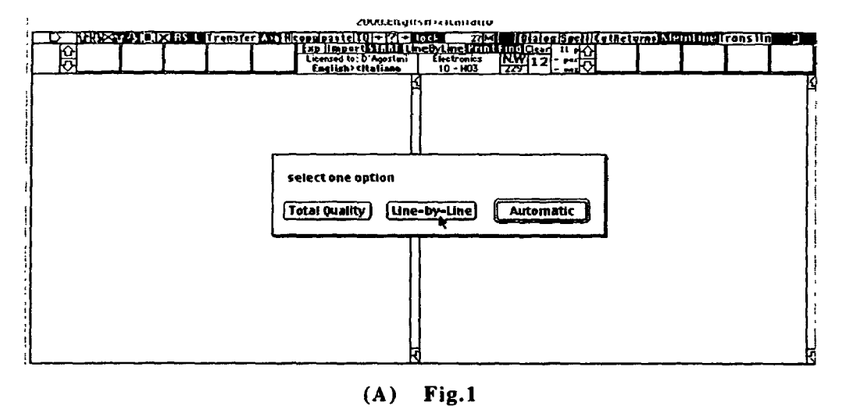
Figure 2:
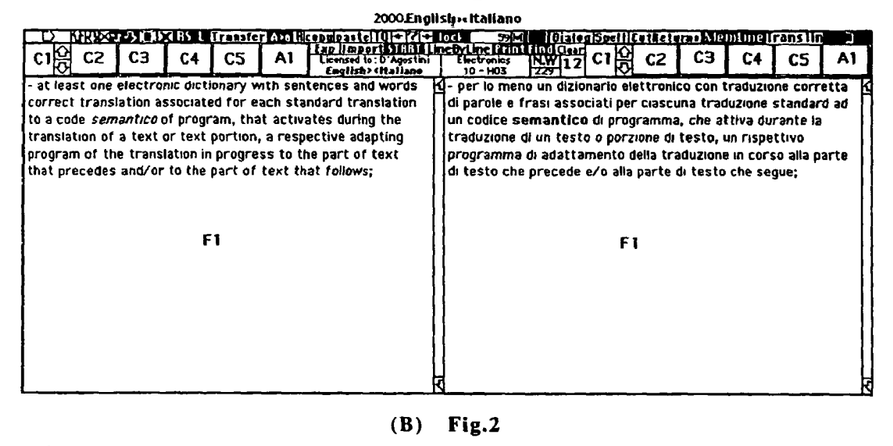

As disclosed in the FIGS. from 1 to 18, and particularly from FIG. 2, the system includes substantially at least two columns, comprising at least two scrolling parallel main fields, one adjacent to the other (F1, B/U) one for the text to translate and one for the translated text to correct.

Under the line of the controls there are to the right and to the left of the charging fields (C1, C2, C3, C4, C5) to charge with the import control button the text to translate up to 100 pages (20 pages per field) in order to translate automatically or semi automatically as from the option (A) of FIG. 1.

The text in progress of translation passes from chargers (C1, C2, C3, C4, C5), to the pair of the translation main fields. (F1, B/U). Once the translation and correction has been completed, the couple of the texts passes to the pair of accumulator fields (A1), that can shift: from small under the control-bar (adjacent to said chargers), to proportioned over the same pair of translation main fields (A1, F1, Ref. U FIG. 21).

One can also charge a text directly in a main field of the main pair of the translation fields (F1, B/U) and obtain the translation into the opposite main field of the said main pair (F1).

Analogously any combination of charger fields can happen (C1, C2, C3, C4, C5) toward the main fields (F1, B/U) and then pass to opposite side of the main fields pair in logical sequence and flow finally in the opposite charging fields.

As for example if one has to translate from Italian one will activate the direction from right button towards the left button as in the FIGS. from 1 to 18, see indication evidenced by the top right arrow button in the control line (From English to Italian is the contrary).

Once the work is completed one can use the Export control button ("Exp"=Export).

The system is divided by modules, each including a couple of languages, therefore in the representation is shown a single one of the operative modules that concerns in a reversible way the translation from English to Italian or vice versa.

Figure 19:
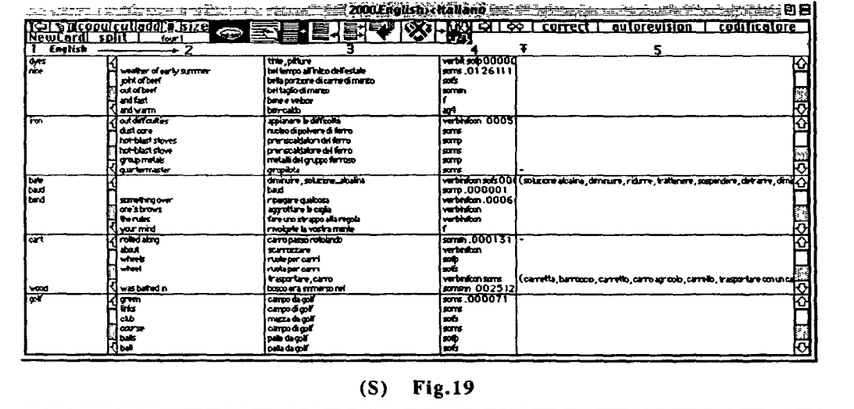
FIG. 19 shows the electronic dictionary to accumulate the autolearnings.

Also the dictionary (S FIG. 19) is double, one for the Italian towards English and one for English towards Italian (the disclosed is for the translation from English towards Italian).
Both have a series of fields:
for searching the single words during translation (1),
for the text portion that follows the word under consideration (up with five words for a total of six), (2);
for the base standard translation (3);
for the program semantic code/s (4) and
for alternative translations personalized with operative sectorial codes, (for example electronics, physical, chemistry, etc.) (5).

We can give also two codes and two different translations to each teaching as for example able to be read in field (S column 3) Eg. "cart"="trasportare, carro" with the attributed codes "verbinfcon" and "soms", to say that the first word is an infinitive verb that one must conjugate in conformity with the context of the sentence and in particular with what precedes it, while alternatively one must translate as singular male noun and adapt obviously possible articles, pronouns etc front in the part already translated in conformity, move behind possible adjectives arranging them, etc.

These codes are supplied by the operator during the autolearning, and they are determinant and indispensable for having an excellent quality of the result.

As for example "ag4" means adjective with 4 declensions, "ag2" adjective with two declensions, "ag1" invariable adjective.

Similarly the code-prefix "verb" indicates that we have a verb, the prosecution with "con" means that the verb has to be conjugate, the prosecution with "inf" means that the current verb is an infinitive verb, the intermediate fragment "ing" means that the current verb is a gerund, the intermediate fragment "pass" means that the current verb is a past verb, etc.

E.g. if the code that writes the operator, in the autolearning during post-editing, is "verbls/p2432", it means that the system must adopt the adapting program of the verbs in which Ref." "1 s/p" gives an order to the program to adapt the first word to context of the sentence in the sense of the singular/plural conjugation, the following number "24" gives the order to the program about the second word informing it that is a past participle and obliges the program to accord it in conformity to four solutions (E.g. a, e, i, o, for Italian language), while the third word "32" gives the order to accord only in two solutions: plural and singular.

These codes are a lot and the operator can arrange them in a different way, as an object programming language, but in which the sequence modules of the program are already inserted and therefore the operator knows the result that he is going to obtain, not needing to be a programmer.

Naturally above there is a control-bar that allows the operator to operate changes at will, on all the fields that are obviously in a parallel scrolling form for exact alignment correspondence.

Coming back to the main translation interface (FIG. 2), it has been claimed that the fields of each couple (F1, B/U) self-adjust in the width inversely proportional to length of the texts of the couple, in order to always supply the same number of lines (scrolling height pitch) to facilitate comparison and reduce the correction check times in post-editing.

The pair of accumulators (A1, Ref. U FIG. 21) have instead the intermediate function to accumulate the sentences in turn that are translated and corrected.

The control bar of the main interface, also has a lot of figurative control buttons, as for example parallel field pairs scrolling controls, their alignment, the interface changing in size, the search and replace control "RS", capital to small letter change, the transfer control between fields and a Data File, the copy pastage controls, the word counting, the lock/unlocking, the spelling, the "cut-returns" for the arrangement of texts from a "DOS" system having one return per line, that causes illogical analysis of the sentence, and the different controls of how to carry out the translation, as: "START" for starting or to take up a translation from the position where one was at before;

"LineByLine" to proceed paragraph by paragraph;

"TQ" for the interactive translation system in Total Quality, where each fragment between punctuation is submitted before registering it in the opposite field during control and check of the translation for the correction and autolearning;

"MemLine" (Checking Action Mode) that allows after an automatic translation the transfer into the pair of accumulator fields (A1), line-by-line (namely paragraph by paragraph) the checked and corrected paragraphs from main fields pair (F1) to the accumulator field pair (A1);

"Trans1Lm" that activates the automatic retranslation of the selected paragraph;

The visualization controls of two or four or six fields "2/4" and "2/6".

Unwinding of the method in interactive translation paragraph by paragraph (example from Italian English of this invention with activation of the right upwards arrow and without visualization of the options 4 and 6 fields, namely in the less reduced shape with visualization of only two main fields of translation and correction.

Figure 3:
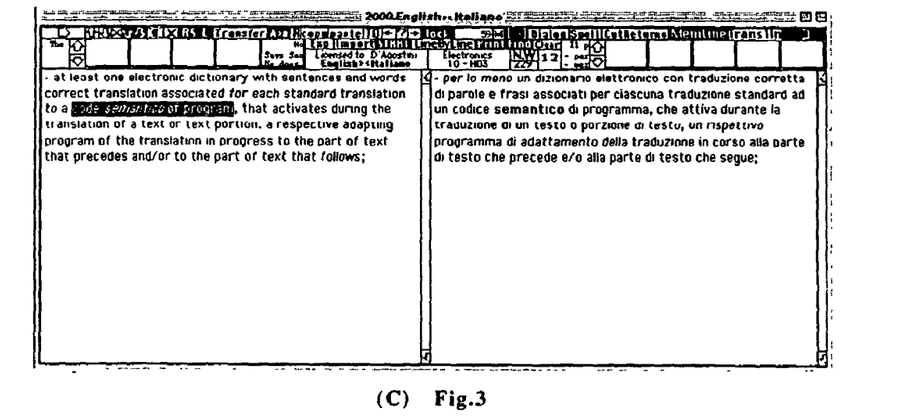
Figure 4:
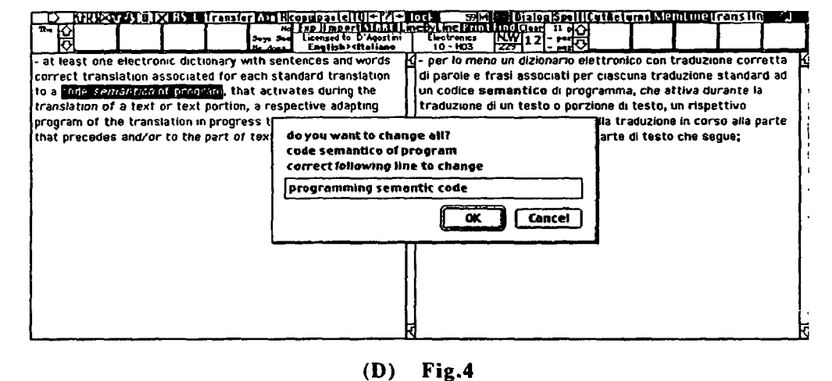
Figure 5:
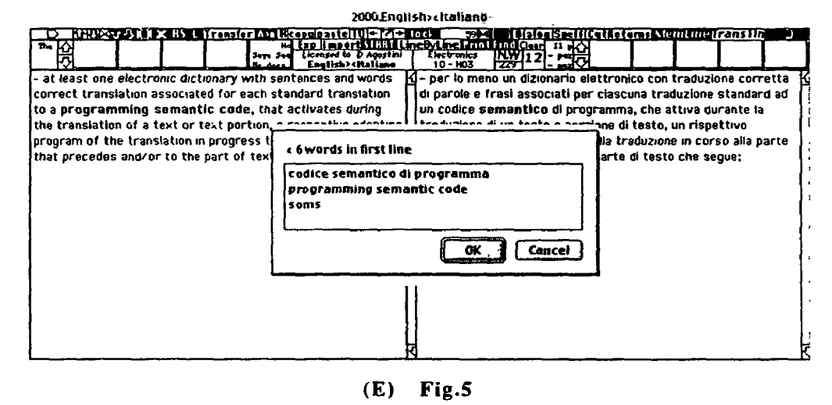
Figure 6:
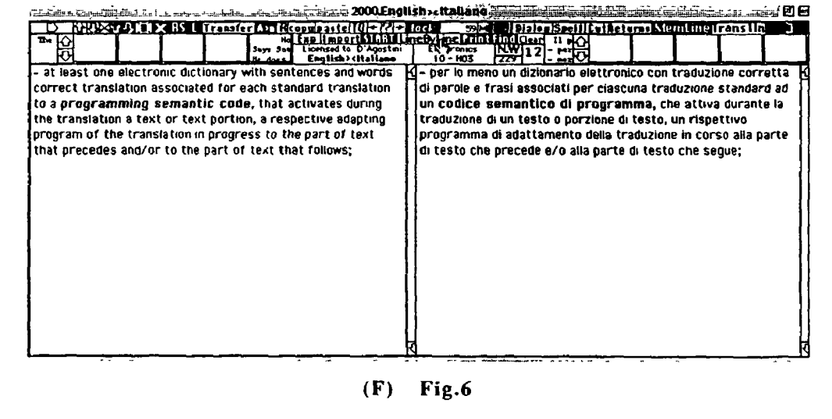
Figure 7:
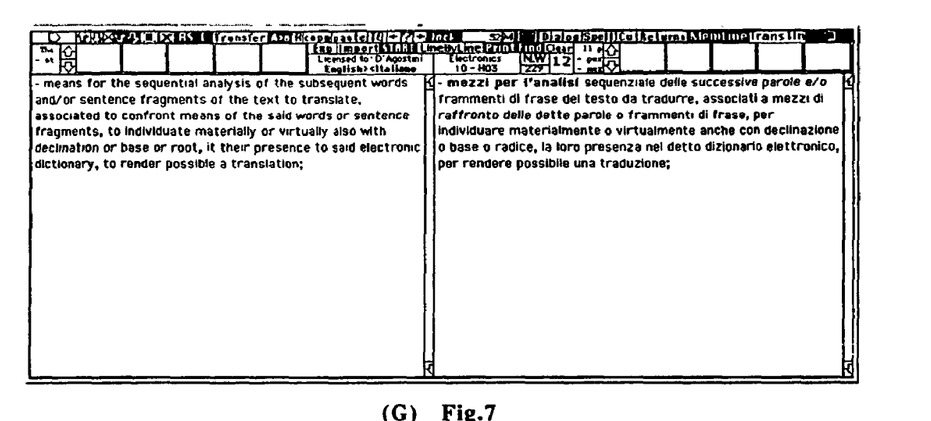
Figure 8:
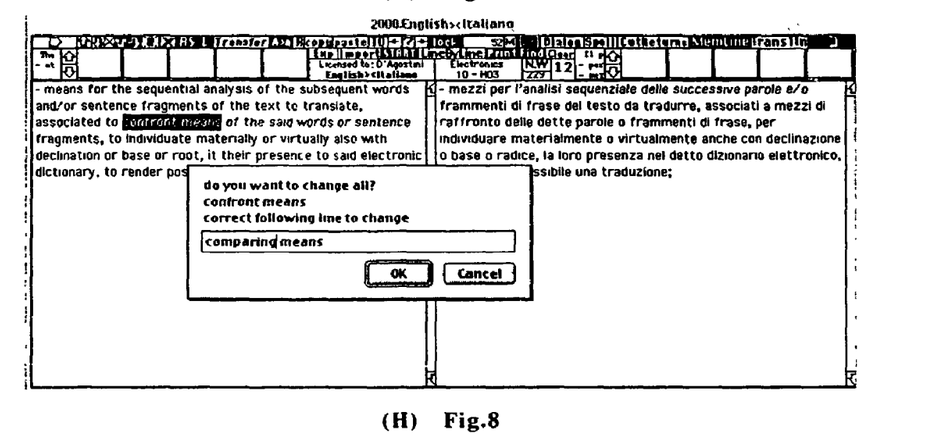
Figure 9:
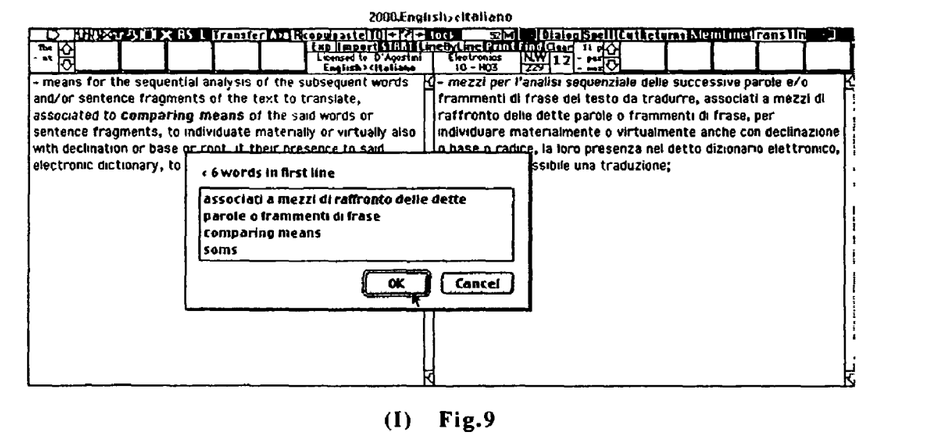
Figure 10:
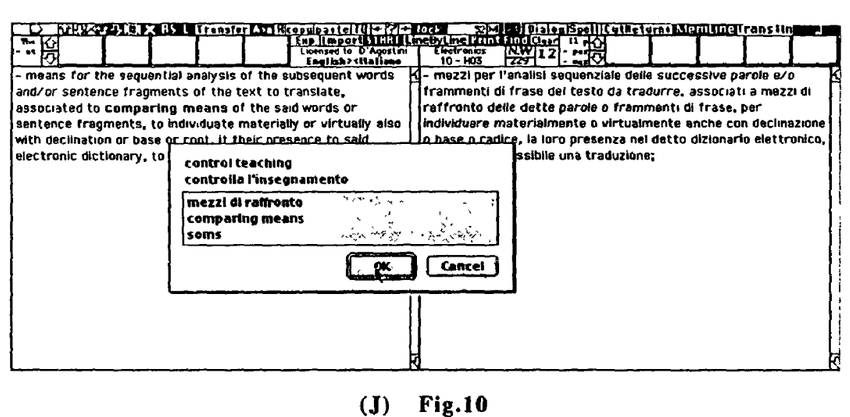
Figure 11:
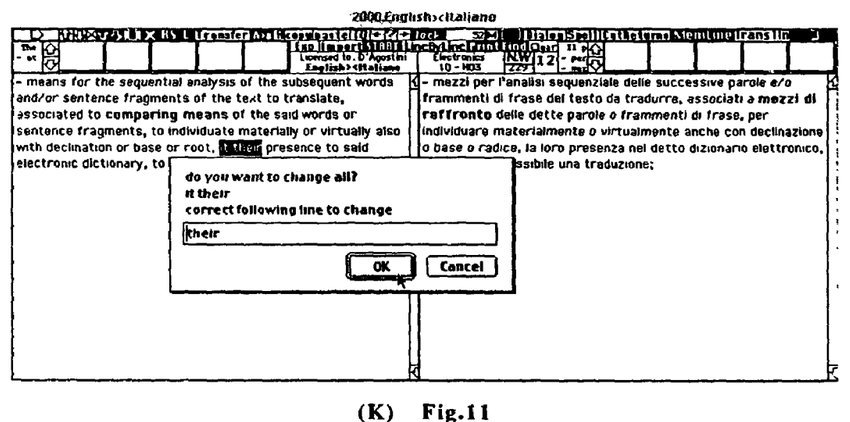
Figure 12:
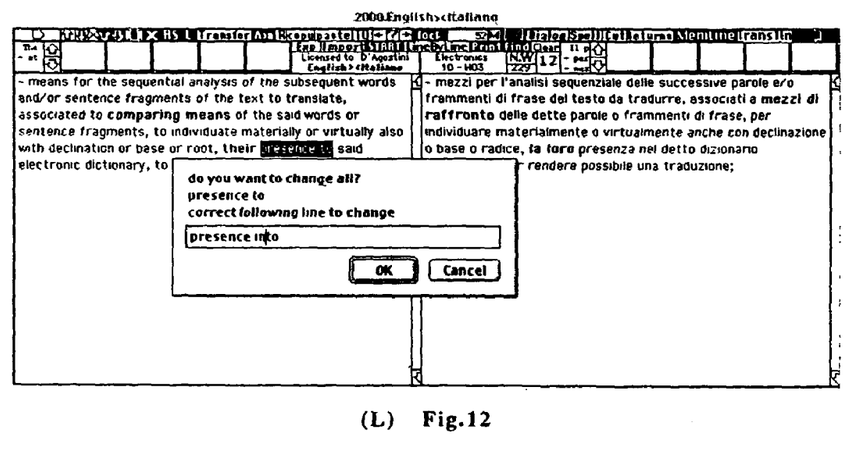
Figure 16:
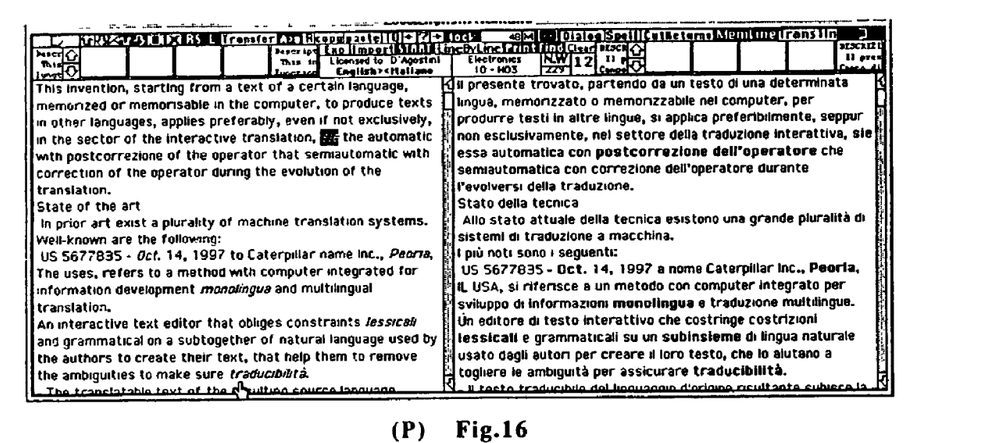
Figure 17:
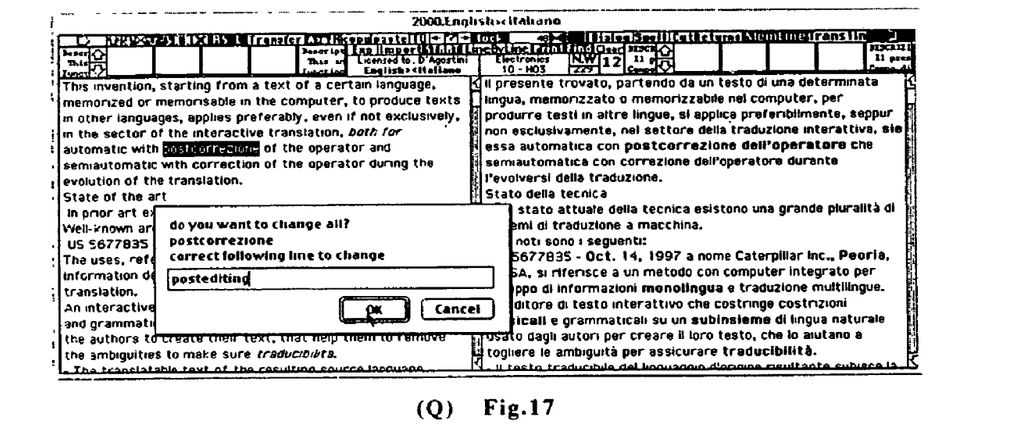
Figure 18:
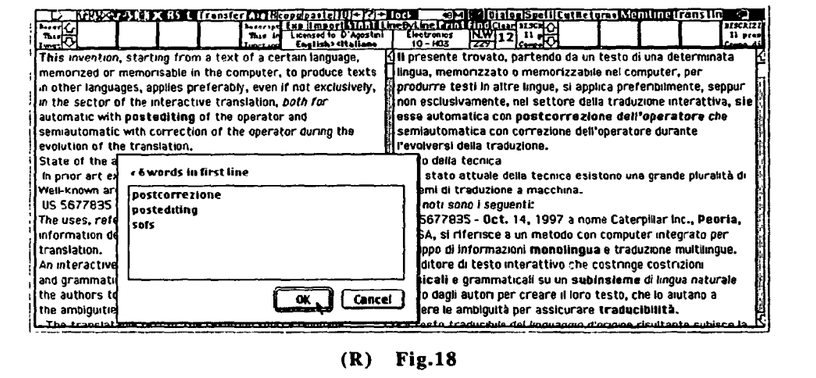

FIG. 1 text to translate is loaded (C1 see FIG. 2), if it is longer then 20 pages, it is divided occupying the adjacent fields (C2, C2, . . . etc.), the "START" button is pressed and a window appears (A) that indicates the mode that one wants to operate, namely interactively "TOTAL QUALITY" or paragraph by paragraph "LineByLine" or in automatic way "Automatic", in the last case "LineByLine" button is pressed and the translation starts developing paragraph by paragraph coming from the field of the right chargers (C1) and outputting paragraph by paragraph in the main fields (F1, B/U) in a fully automatic way, these steps develop instantaneously, given the speed of the current processors, therefore the operator has not practically waiting times;

FIG. 2 each paragraph (paragraph is intended as a line, in "word Process", namely from return to return) is shown for the correction of the operator indicating in bold the missing words ("semantics") and in italics in the opposite side (the same not translated word "semantics"), in this way the operator has the possibility to see immediately the missing word Ref. (B);

FIG. 3 the operator directly corrects the single word, and the system will autolearn it, or can signal the whole sentence fragment defining univocally in a correct way the translation (C), in such case, FIG. 4, the system immediately opens a window and asks if one wants the automatic change (D);

FIG. 5, completed the search-replacing (RS), the system asks if one wants the autolearning proposing the programming semantic code, that can be modified by the operator the same for the teaching, and with "OK", the system completes the autolearning (E) and FIG. 6, underlines what is corrected from both sides (F), FIG. 7, continuing to push the button "LineByLine" the translation develops in the same way until the end, FIG. 8, finding translation errors we always can correct and teach them to the system in a similar way (H);

FIG. 9, if the system is unable to trace in an identical way the exact corresponding text portion to the correction, it asks the operator in window to evidence the corresponding portion (I);

FIG. 10, and then asks the authorization to the autolearning (J);

FIG. 11, 12, 13, the system asks also the authorization to change what was corrected for the whole translation (K, L, M);

FIG. 13, once the corrections have been terminated one continues in this way until the end of the text. Carrying out the method with automatic pre-translation the method provides first the automatic translation option in the window (A), then FIG. 13, it provides the entire automatic translation of the text in the main fields (F1, B/U) for the correction (M);

FIG. 14, 15, 16, 17, the operator checks and corrects paragraph by paragraph as in the previous solution, with the sole difference that behind it one has always the possibility to see the whole text to check on both fields.(N, O, P), proceeding till end.

Preferred alternative representation of the user interface

The representation (interface), as said may be:

with sole two fields (restricted and small screen) or four-fields (FIG. 20) where above the main couple (F1, B/U) the accumulating field pair of what is translated and checked (A1) is applied, or with six fields (FIG. 21), in which over to the four of the previous solution, a further pair of fields containing on one or on the other the remaining text portion to translate (L1 Ref. U FIG. 21).

The six field solution being obviously the best for a more complete visualization of the translation and correction in progress and of the remaining portion to translate.

Figure 20:
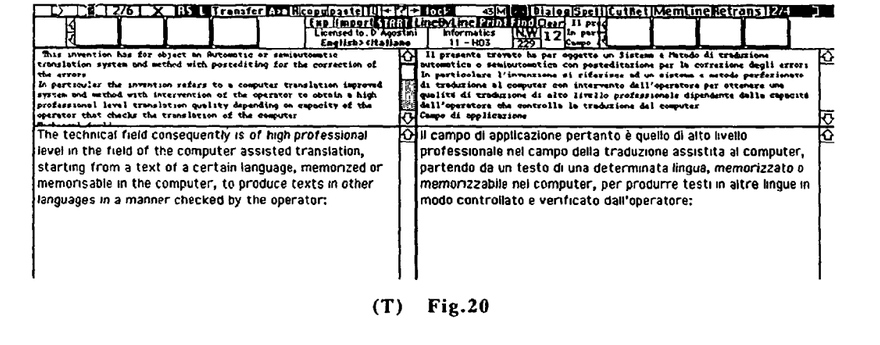
FIG. 20 represent represents a view of the screen with translation and correction fields and a corresponding pair of accumulator fields.

FIG. 20 (Rif.T), represents a view in which appears on the screen the shape, always respecting the two columns, but with two pairs of scrolling proportioned fields, namely with four scrolling fields, respectively the said pair of the translation and correction main fields and above this the pair of accumulator fields of what is translated, checked and corrected, in order to avoid waiting time of the previous line by line translation system, allowing the translator, in this waiting time, to read the previous translation during retranslation.

FIG. 21 (Ref. U), represents a view of the system in which appears on the screen the shape always with two columns but with three pairs of scrolling proportioned fields, namely six fields respectively the pair of the translation and correction main fields and above this the pair of accumulator fields of what was translated, checked and corrected, and under the pair of the main fields the pair of fields including in one or into the other the remaining text to translate.

FIG. 22 (Ref. V), represents what appears on the screen when one asks the representation option of the comparison with a translated and corrected text outside the system, namely with three columns instead with two, where the third column is that of the outside translated and corrected text, utilized for the comparison with the couple of main columns as in previous figures.

FIG. 23 (Ref. Z), represents a four-fields view during a correction in post-editing with automatic passing of the text corrected by the pair of translation and correction main fields (F1, B/U) to the upper accumulation pair (A1 Ref. U FIG. 21).

Coding examples of behavior or semantics of the teachings

Basic possible codes are innumerable as already explained, for example in the field of nouns "soms", "somp", ."sofs", "sofp" is provided, that are the masculine and feminine combined with the singular and plural, and additionally able to be combined with e.g., "somsn" word group as a substantive (noun) that does not shift (because it is not associable with adjectives), "sofpnn" as previously but already containing the article, "somsNP" as proper noun, etc. or "ax2", "ax4" for words and sentences in which one requires an adapting of the endings to that which will be subsequently translated (e.g. in accordance to a next substantive), or "ag1", "ag2", "ag4" to be accorded and moved to the substantive, or "nexinf" to oblige the following choice in translation to infinitive or "nexverb" to oblige the choice of the next translation to qualify as a verb, or "nexfut" to condition the next to past tense, etc. as an encoded language that in turn transmits the activations of the program similarly to the human intelligence and to the human structure as noticeable for example in a Dna, but electronic, where its manipulation is directly allowed by the operator who manages the translation.

In this way it has been shown to reach very high levels of translation because the more the computer works the more it improves becoming ever more intelligent, but on the condition that the operators who uses it, correct it and teach it how it must behave from that moment on, exactly as one does with a child.

Advantageously the operative sectorial codes as said are classified according to the international patent classification or in any event for sectors, able to be customized (A—e.g. "Electronics 10-H03" where 10 is the assigned code, H03 corresponds to the code of the international patent classification Ipc).

Subdivision of the sectors (the following shows a form of subdivision for sectors that the operator selecting, automatically activates before translation):

1 B62 Vehicles, Veicoli, Véhicules, Fahrzeuge, Vehiculos
2 B61 Railways, Ferroviario, Chemin de fer, Eisenbahn, Ferrocarril
3 B63 Marine, Hydraulics, Marina, Marine, Eaux, Hydraulik, Wasserwirtschaft
4 B64 Aerospace, Aérospatiale, Luftfahrt/Raumfahrt, Aerospacial
5 A/B/F/G Technology, Tecnologia, Technique, Technik
6 C21/C30 Metallurgy, Metallurgia, Metallurgie, Metalurgia
7 E21 Mining, Minerario, Minières, Bergbau, Mineras
8 E01/E06 Building, Edilizia, Construction, Bauwesen, Construcción
9 H01/H02 Electricity, Elettricità, Electricité, Elektrik, Electricidad
10 H03 Electronics, Elettronica, Electronique, Elektronik, Electrónica
11 H03 Informatics, Computer, Informatica, Informatique, EDV
12 H04 Telecommunications, Mail, Telecomunicazioni, Telekommunikation, Telecomunicaciónes
13 H02/D07 Textile, Clothing/Wearing, Tessile-Abbigliamento, Textilien,
14 G03 Film/Camera, Fotocinematografia, Cinéphotographie, Kino/Foto
15 A63 Sport/Amusement Sport/Divertimento, Sport/Jeux,Sport und Spiel, Deporte y juegos
16 C0/C14 Chemistry, Chimica, Chimie, Chemie, Química
17 A01 Agriculture Vegetal, Agricoltura-Vegetali, Agriculture/Plantes, Landwirtschaft-Pflanzen
18 D21-B30/B44 Editing/Paper, Editoria/Carta, Editions/Papier, Verlagswesen/Papierindustrie, Edición/Papel
19 F41/F42 Military/Guns/Explosives, Militare/Armi/Esplosivi, Militaire/Armes/Explosifs, Militär, Militar/Armamientos/Explosivos
20 G12/21 Nuclear/Physics/Atomics, Nucleare, Nucléaire, Kernkraft/Physic
21 G10 Music/Arts, Musica/Arti, Musique/Arts, Musik/Kunst, Música/Artes
22 Legal/Law, Legale/Legge/Diritto, Droit, Recht, Derecho
23 G06 Accounting/Mathematics, Contabilitá/Matematica, Comptabilité/Mathématique, Buchhaltung/Mathematik, Contabilidad/Matemática
24 Business/Correspondence/Mailing, Commerciale/Affari/Epistolare, Commerce/Correspondance, Handel/Briefe, Comercio/Correo
25 A61/63 Man, Corpo/Uomo, Homme, Mensch/Allgemein, Hombre/Cuerpo
26 A61/63 Food, Alimentazione, Alimentation, Essen, Alimentatión
27 A61 Medicine/Health/Pharmaceutics/Drugs, Medicina/Farmaceutica, Médecine, Medizin
28 Religion, Religione
29 Insurance, Assicurazione, Assurances, Versicherungen, Seguros
30 Banking/Financial, Bancario/Finaziario, Bancaire, Möbel
31 A01-A61 Animals, Animali, Animaux, Tiere, Animales
32 C07/14 Biology/Genetics, Biologia, Biologie 33 Geography/Tourism, Geografia/Turismo, Geographie/Tourisme
34 Linguistics, Sprachwissenschaft
35 Literature
36 Politics
37 Colloquial, Umgangssprache
38 A24 Tobacco, Tabac, Tabakwaren
39 Dialog, Dialogo, Diaqlogue
39 Personal, Personale, Persönlich The method is applied to a computer comprising an automatic translation system having on a monitor, a "T"-shape translation interface wherein the upper bar of the "T" is a line of control-buttons and the vertical bar of the "T" is a dividing line forming two columns inversely proportioned in width to the length of the respective contained text (column having longer text is wider than parallel column that contains a shorter text), where the two columns are divisible horizontally in pairs of parallel-scrolling fields, involving at least a pair of main translation fields (F1, B-U) and above it a pair of accumulator fields (accumulating fields) of what has been translated and checked (A1, U).

The system is able to show an additional pair of scrolling fields below the main translation fields (F1, B/U) and with same proportion of the above, to include in one or the other the text portion to translate (L1, U).

Advantageously after transfer of the checked top paragraphs text from the main pair of fields (F1-Z) to the bottom of said accumulating-fields pair (A1), said automatic retranslation is operated on the first top paragraph of the said main pair of fields (F1-Z) of the remaining text to check, in order that in the respective retranslation, waiting time, the operator is allowed to read the previous translation and prepare oneself for amendments after issue of said retranslation in the first paragraph.

In this way the Operator does not lose time in waiting for retranslation, because he uses the waiting time to read the top-paragraph to check.

When retranslation has been made (instantly) first translated paragraph is exchanged with the new first paragraph coming from said better performed retranslation (because said autolearning), and finally allowing instantly to amend the retranslated top-paragraphs, in the usual autolearning way, before continuing in transfer from said pair of main fields (F1-Z) to said accumulating pair of fields (A1-Z). Obviously, the operator is not allowed to make amendments, during retranslation.

Before checking paragraph by paragraph, said retranslation is made only if the interested paragraph to check contains text portions already subjected to previous amendments and autolearning, made between the full automatic first translation and the moment to check.

In this way retranslation is avoided if the interested top paragraph does not contain text portions involved in previous autolearning subject matter. So retranslation is automatically operated only if necessary.

This solution allows further reduction in waiting time.

The invention claimed is:

1. A computer translation system having viewing means on a monitor of a translation-interface having a couple of text-columns, characterized in that said couple of text-columns are divided horizontally to form at least two pairs of parallel scrolling fields, wherein each text-column includes vertical parallel scrolling field means, said at least two pairs comprising a main pair of scrolling fields including a main translation field having text to be translated, wherein the system translates the text in the main translation field to provide translated text, and a correction field, having the translated text, for checking and correcting the translated text, and a second pair of scrolling fields, located above the main pair, including first and second accumulating fields for accumulating text from the main translation field and the correction field, respectively, and wherein, said translation system has transfer means to progressively transfer a portion of the texts in said main translation field and said correction field to said accumulating fields.

2. A computer translation system according to claim 1, having viewing means on the monitor of the translation-interface comprising a T-shaped structure having an upper bar and a vertical shank, where the upper bar of the T-shaped structure comprises a line of control buttons and the vertical shank is a dividing line forming the couple of text-columns, wherein each column includes vertical scrolling field means, each text-column having a width proportional to the amount of text therein, characterized in that said couple of text-columns is divided horizontally forming at least a T-shaped structure with a lower bar through the shank forming the at least two pairs of parallel scrolling fields, further comprising evidencing means that evidences modified text in said main translation field and said correction field.

3. A computer translation system according to claim 2, having paragraph-counter means to show a number of remaining paragraphs of text to be checked and corrected.

4. A computer translation system according to claim 2, having means to show an additional pair of scrolling fields below said main translation field and said correction field, wherein at least one of said additional scrolling fields includes text to be translated.

5. A computer translation system according to claim 2, having auto-correction means and retranslation means to retranslate at least some of the text in said main translation field and said correction field.

* * * * *